(12) United States Patent
Henry

(10) Patent No.: US 6,848,881 B2
(45) Date of Patent: Feb. 1, 2005

(54) TILTABLE HAND TRUCK

(76) Inventor: Robert L. Henry, 251 Jeanell Dr., #2, Carson City, NV (US) 89703

( * ) Notice: Subject to any disclaimer, the term of this patent is extended or adjusted under 35 U.S.C. 154(b) by 0 days.

(21) Appl. No.: 10/386,090

(22) Filed: Mar. 10, 2003

(65) Prior Publication Data
US 2004/0179926 A1 Sep. 16, 2004

(51) Int. Cl.[7] .................................................. B60P 1/04
(52) U.S. Cl. ....................................................... 414/469
(58) Field of Search ................................ 414/467, 469, 414/480, 482; 280/30, 47.131

(56) References Cited

U.S. PATENT DOCUMENTS

| | | | |
|---|---|---|---|
| 331,748 A | * 12/1885 | Holden ......................... 280/30 |
| 1,706,253 A | 3/1929 | Raymond | |
| 2,494,725 A | * 1/1950 | Schwitzer et al. ........... 414/469 |
| 2,696,928 A | * 12/1954 | Faircloth ..................... 414/469 |
| 2,860,800 A | 1/1958 | Wilson et al. | |
| 3,486,252 A | 12/1969 | Daniels | |
| 4,155,471 A | * 5/1979 | Yancy ......................... 414/420 |
| 4,673,328 A | * 6/1987 | Shiels .......................... 414/471 |
| 5,059,085 A | * 10/1991 | Koller ......................... 414/482 |
| 5,277,439 A | * 1/1994 | Pipes et al. ................. 280/47.2 |
| 5,308,213 A | * 5/1994 | Gilbertson ................... 414/482 |
| 5,474,416 A | 12/1995 | Rogge et al. | |
| 5,669,659 A | * 9/1997 | Dittmer ....................... 297/129 |
| 5,688,099 A | 11/1997 | Fischer | |
| 5,820,141 A | * 10/1998 | Wilkerson et al. ............ 280/30 |
| 6,390,496 B1 | * 5/2002 | Eicher ......................... 280/653 |

* cited by examiner

*Primary Examiner*—Richard Ridley
(74) *Attorney, Agent, or Firm*—David R. Preston & Assoc.; Mo Savari

(57) ABSTRACT

The present invention provides to an improved hand truck having a tiltable platform for carrying heavy objects, which is safe to use and easily maneuverable, and requires the minimum amount of energy required for movement of heavy objects. The present invention provides a tiltable hand truck with minimal risk of injury and minimal risk of accidents for the operator while operating the present invention. The present invention provides a method for transporting a heavy load using a tiltable platform, which makes it easy for heavy objects to be transported with minimal effort.

19 Claims, 4 Drawing Sheets

TILTABLE HAND TRUCK

BACKGROUND

The present invention relates to a tiltable hand truck having a tiltable platform for the loading of heavy objects further having a steeling assembly that allows for the movement of the heavy object in any direction. The present invention is particularly adaptable to lift any object that can be tipped or tilted to facilitate loading onto the tiltable platform.

A variety of hand trucks and dollies for movement of heavy objects are commercially available. Hand trucks and dollies can be used for a variety of purposes, such as transportation of heavy plant pots, movement of heavy boxes in warehouses, movement of heavy furniture and equipment, and generally facilitating the movement of heavy articles from one point to another. Many of these hand trucks and dollies are awkward to maneuver and exert much strain on the operator's joints, back, and muscles. Many of the commercially available hand trucks and dollies can cause severe injuries when improperly handled or improperly balanced. The present invention addresses these problems, and provides related benefits.

SUMMARY OF THE INVENTION

The present invention relates to a tiltable hand truck that is safe to use and easily maneuverable, which requires the minimum amount of energy required for movement of heavy objects. The present invention provides a tiltable hand truck with minimal risk of injury and minimal risk of accidents for the operator while operating the present invention. This is because unlike existing dollies where the operator's body and strength acts to balance the weight of the object to be moved, the present invention required minimum energy to load an object and minimum effort and skill to maneuver.

One objective of the present invention is to provide an improved hand truck with a tiltable platform that is particularly adaptable to lift any object that can be tipped or tilted to facilitate loading onto the tiltable platform. The tilting of a heavy object that is to be moved requires much less energy than lifting the object. Tipping or tilting the object to be moved, exposes its underside, allowing the tiltable platform of the present invention to engage the object and act as a receiving dock for the tilted object. Moving the tiltable platform back to level position causes the weight of the object to balance at the pivot point and be loaded onto the tiltable platform with ease and without much effort by the operator. One advantage of the present invention is that the tiltable platform lifts into position the object to be moved in an upright position, which can then be transported and steered away to the location of choice.

Another objective of the present invention is to provide a hand truck with preferably a latchable tilting platform that can be tilted such that one end swings downwards to the ground and the opposite end swings upwards forming an incline. The end that swings downward can be positioned such that the topside of the tilting platform comes into contact with the bottom side of the tilted object to be moved. When the platform is tilted to level position, the object is automatically loaded onto the tilting platform by way of its own weight. The tiltable platform can then be locked into position by the latch in order to avoid further movement of the tiltable platform. Preferably, the present invention provides means for tilting the tiltable platform into loading position. The tilting can be achieved, for example, by attaching a raising bar to the stop shaft situated underneath the tiltable platform such that when the stop shaft is rotated by means of a handle, the raising bar rotates with the stop shaft and raises the tiltable platform. The tiltable platform is designed to tilt by pivoting means. The pivoting means is preferably attached to the midpoint of the tilting platform, but the pivoting means may be attached to the underside of the tilting platform in an off-centered configuration in certain embodiments of the present invention depending on the type and weight of the load to be moved.

Another objective of the present invention is to provide a hand truck with a plurality of wheels that allow for even distribution of the weight of the object to be moved and to facilitate the maneuvering of the loaded hand truck.

Yet another objective of the present invention is to provide for a tiltable hand truck with a steering assembly, which steering assembly is rotatably connected to the frame that houses the tiltable platform. This configuration facilitates precise locomotion and is highly maneuverable.

Another objective of the present invention is to provide a method for transporting an object from one place to another comprising the steps of providing a rigid frame having three sides an opening in front, providing means for locomotion such as wheel, tires, or other means capable of facilitating the locomotion of the device and load, preferably providing means for steering the device, and providing a pivoting carrying platform attached to said rigid frame. This method for transporting objects includes placing an object on the pivoting platform while the pivoting platform is in the loading position, that is the side of the pivoting platform near the open front is pivoted downwards to the ground, and the opposite side has pivoted upward forming an incline. In this position the object to be moved is tilted or tipped to one side so as to expose the underside of the object, and allow the pivoting platform access to the underside of the object. Once the underside of the object is contacted to the topside of the pivoting platform in the load position, the object to be moved is tilted back or untipped onto the carrying platform bringing the pivoting carrying platform to a level position, where a stop shaft halts further movement of the pivoting carrying platform and the loaded object.

Further objectives and advantages of the present invention will become apparent as the description proceeds and when taken in conjunction with the accompanying drawings. To gain a full appreciation of the scope of the present invention, it will be further recognized that various aspects of the present invention can be combined to make desirable embodiments of the invention.

DETAILED DESCRIPTION OF THE INVENTION

Figure 1:
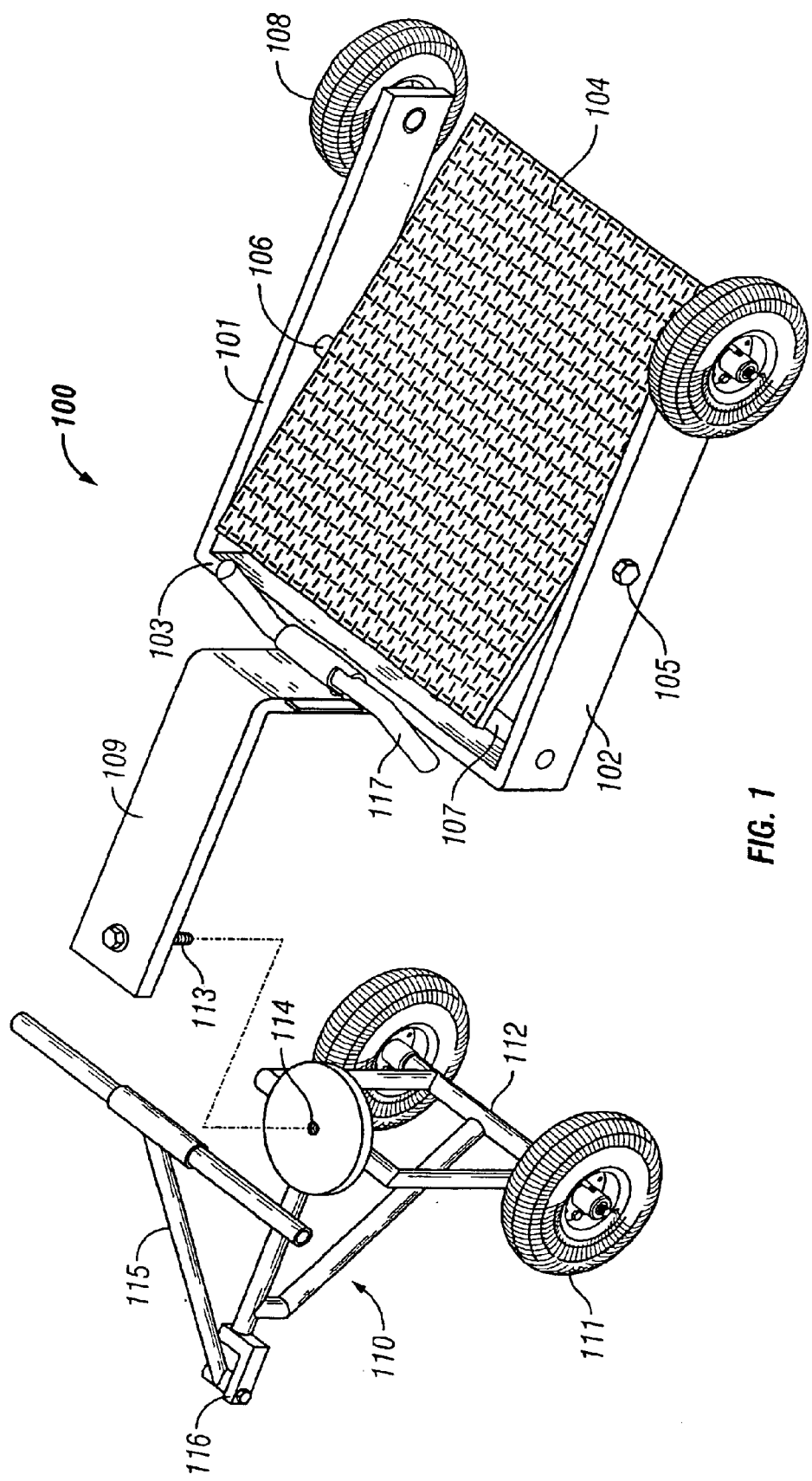
FIG. 1 is a is a top/side prospective view of the tiltable hand truck with the carrying assembly and the steering assembly in detached configuration with the tiltable platform positioned for receiving an object to be moved.
Figure 2:
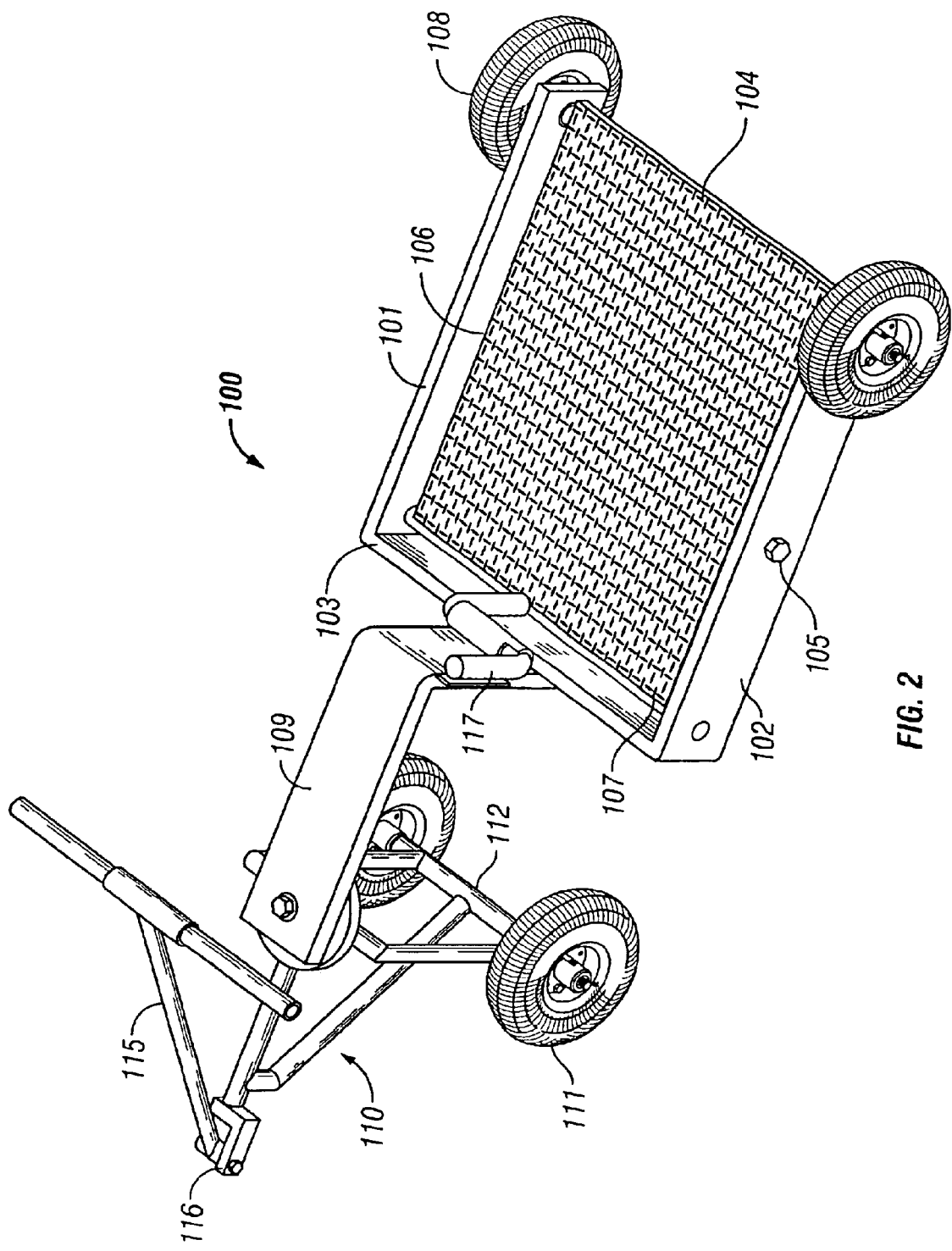
FIG. 2 is a is a top/side prospective view of the tiltable hand truck
Figure 3:
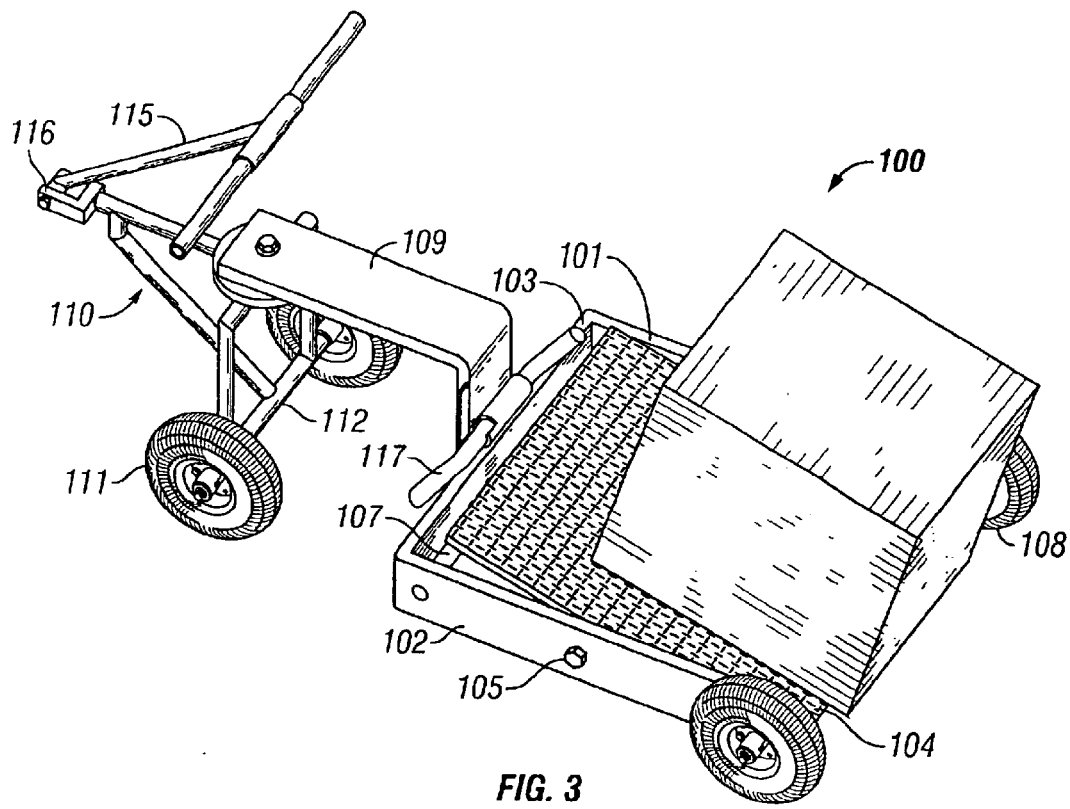
FIG. 3 is a top/side prospective view of the tiltable hand truck with the tiltable platform positioned for receiving an object to be moved showing a heavy object being loaded to be transferred to a new location.
Figure 4:
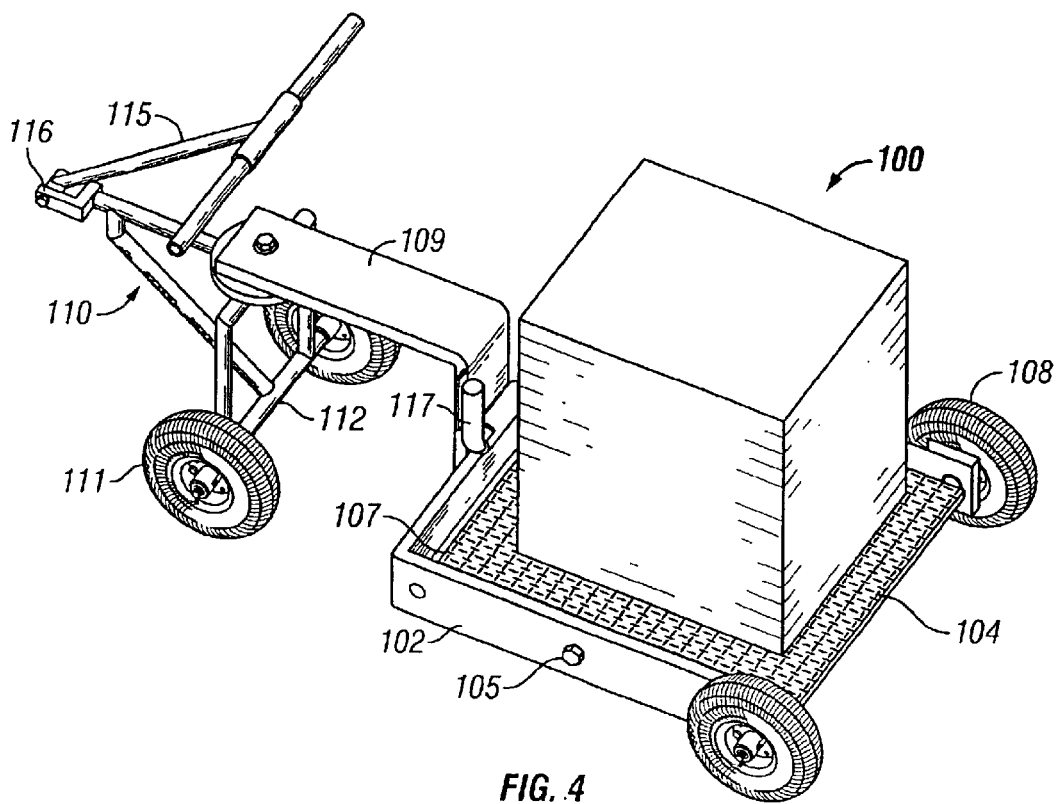
FIG. 4 is a top/side prospective view of the tiltable hand truck with the tiltable loaded with a heavy object to be transferred to a new location.
Figure 5:
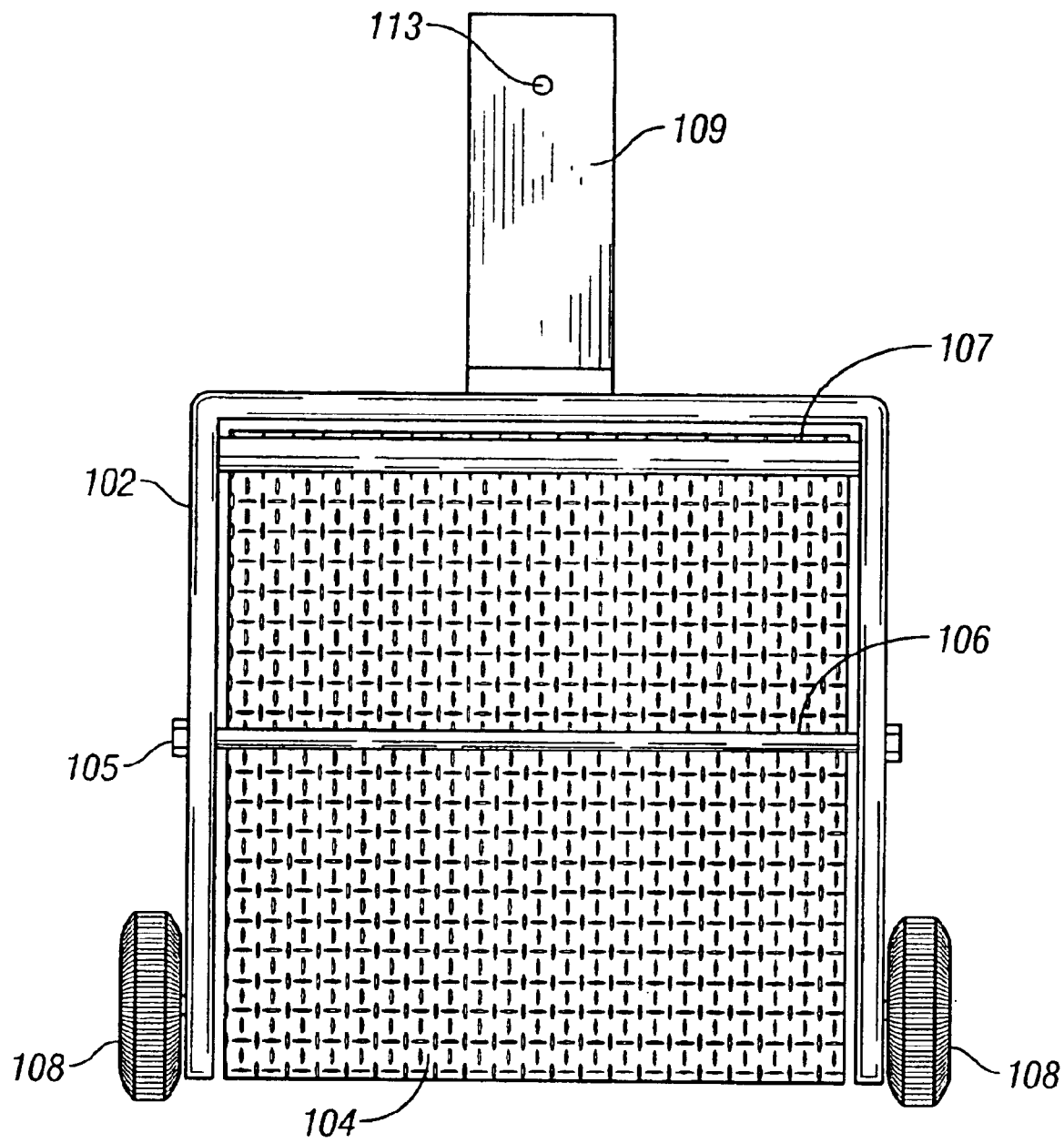
FIG. 5 is a bottom side view of the tiltable hand truck showing the details of the underside of the tiltable hand truck with stop shaft and pivoting means.

Referring to FIGS. 1–4, the tiltable hand truck comprises a substantially U-shaped frame 100, having a right side member 101 and a left side member 102 and a rear member 103, a tiltable platform 104 is pivotally attached at one side to the right side member 101 and at the other side to the left side member 102 by way of a pivot 105, which is fixedly attached at one side to the right side member 101 and at the other side to the left side member 102. The tiltable platform 104 is fixedly attached to a hollow sleeve tube 106, which acts as the sleeve for the pivot pin 105, whereby the tiltable platform 104 can easily pivot about the pivot pin 105. A stop shaft 107 is fixedly attached at one side to the right side member 101, and at the other side to the left side member 102 near the rear member 103. A plurality of wheels 108 are provided, preferably in pairs, each axially attached to the right side member 101 or the left side member 102. A connecting member 109, preferably attached fixedly to the rear member 103 at one end and releasably and rotatably connected to a steering assembly 110, comprising steering wheels 111 axially attached to a steering shaft 112, said steering shaft releasably and rotatably connected to the connecting member 109, preferably by way of pin 113 and socket 114. A handle 115, preferably attached to the steering shaft 112. The handle may preferably further comprise a multidirectional moveably joint 116 to facilitate steering and operation. The tiltable hand truck may preferably further comprise a latch 117, preferably attached to said connecting member 109 wherein the tiltable platform 104 can be releasably latched in place in order to avoid further movement of the tiltable platform 104.

The substantially U-shaped frame 100 can be manufactured from any rigid material, preferably metals such as aluminum, steel, stainless steel, etc. However, certain embodiments of the present invention may be manufactured from rigid plastics, rubber, woods, carbon composite material, or any variation thereof. The U-shaped frame 100 can be made by attaching three pieces of steel together to obtain the desired shape with a right side member 101 and a left side member 102 and a rear member 103. In a preferred embodiment the U-shaped frame 100 is manufactured by bending a long piece of steel at its proximal ends in order to obtain the desired shape with a right side member 101 and a left side member 102 and a rear member 103. The hollow sleeve tube 106 is preferably welded to the tiltable platform 104 nearly at the dividing line of the tiltable platform 104. The pivot pin 105 is inserted into the hollow sleeve tube 106, and is preferably welded at one end to the right side member 101 and at the other end to the left side member 102. However, the pivot pin 105 can be attached to the side members 101 and 102 by other attaching means such as bolts. The stop shaft 107, is preferably welded at one end to the right side member 101 and at the other end to the left side member 102 near the rear member 103. However, other means of attachments such as bolts may be used. To facilitate smooth locomotion of the tiltable hand truck, especially when carrying a load, a plurality of wheels 108 are provide. The wheels 108 can be made of any type of material, but preferably, the wheels 108 are rubber wheels and are positioned in pairs, each axially attached to the side members 101 and 102, and more preferably the wheels 108 are axially attached outwardly so as not to interfere with any object that is being moved. A connecting member 109, preferably in a goose neck configuration, connects the substantially U-shaped frame 100 to the steering assembly 110.

The steering assembly 110 can be manufactured from any rigid material, preferably metals such as aluminum, steel, stainless steel, etc. However, certain embodiments of the present invention may be manufactured from rigid plastics, rubber, or wood. At least one steering wheel 111, and preferably two steering wheels 111 are provided, each axially attached to the steering shaft 112. In the embodiment where only one steering wheel 111 is provided, the steering wheel 111 is axially attached to each proximal ends of the steering shaft 112 in an inverted U-format. In embodiments with more that one steering wheel 111, each steering wheel 111, is axially attached to each other at one side, and a proximal end of the steering shaft 112 at the other side forming a stretched out inverted U-format. In a preferred embodiment the steering shaft is releasably and rotatably connected to the connecting member 109, and said connecting member 109 is fixedly attached to said rear member 103. However, other embodiments are considered, such as the steering shaft 112 being fixedly attached to the connecting member 109, and the connecting member 109 being releasably and rotatably attached to the rear member 103, or the steering shaft 112 being fixedly attached to the connecting member 109, and the connecting member 109 being fixedly attached to the rear member 103, or the steering shaft 112 being releasably and rotatably attached to the connecting member 109, and the connecting member 109 being releasably and rotatably attached to the rear member 103. A preferred means of releasably and rotatably attachment is by way of pin 113 and socket 114, however other means are considered such as ball hitch and ball hitch receiver or a hook mechanism. In a preferred embodiment, a handle 115 is provided, said handle being fixedly attached to the steering shaft 112. In the preferred embodiment the handle 115 further comprises a multidirectional movable joint 116 to facilitate steering and operation. In a preferred embodiment of the present invention a latch 117 is provided, said latch 117 being fixedly attached to the preferred goose neck shaped connecting member 109. However, the latch 117 may also be fixedly attached to any of the side members 101, 102, or 103. The latch 117 releasably locks the tiltable platform 104 in a level position after the object to be moved has been loaded onto the tiltable platform 104 in order to avoid further movement of the tiltable platform 104.

Another embodiment of the present invention is to provide a method for transporting an object from one place to another comprising the steps of providing a rigid frame 100 having a right side member 101, a left side member 102, and a rear member 103 and open in front, providing means for locomotion 108, 111 such as wheel, tires, or other means capable of facilitating the locomotion of the device and load, preferably providing means for steering the device 110, and providing a pivoting carrying platform 104 attached to said rigid frame 100. This method for transporting objects includes placing an object on the pivoting platform 104 while the pivoting platform is in the loading position, that is the side of the pivoting platform near the open front is pivoted downwards to the ground, and the opposite side has pivoted upward forming an incline. In this position the object to be moved is tilted or tipped to one side so as to expose the underside of the object, and allow the pivoting platform 104 access to the underside of the object. Once the underside of the object is contacted to the topside of the pivoting platform 104 in the load position, the object to be moved is tilted back or untipped onto the carrying platform 104 bringing the pivoting carrying platform 104 to a level position, where a stop rod 107 halts further movement of the pivoting carrying platform 104 and the loaded object.

All headings are for the convenience of the reader and should not be used to limit the meaning of the text that follows the heading, unless so specified. Various changes and departures may be made to the present invention without departing from the spirit and scope thereof. Accordingly, it is not intended that the invention be limited to that specifically described in the specification or as illustrated in the drawings, but only as set forth in the claims.

What is claimed is:

1. A tiltable hand truck comprising:
    a substantially U-shaped frame, having two side members fixedly joined with a rear member forming a rigid structure, wherein the space between said side members furthest from said rear member defines an open front;
    a stop shaft fixedly attached to said two side members near said rear member;
    at least one pair of wheels, each wheel axially attached to each of said two side members;
    a tiltable platform pivotally attached at an intermediate point between said two side members, wherein said tiltable platform is capable of swinging downward to the ground at said open front, and wherein said stop shaft keeps said tiltable platform leveled and does not allow said tiltable platform to swing downward to the ground in the opposite direction;
    a connecting member fixedly attached to said rear member;
    a steering assembly comprising at least one wheel axially attached to a steering shaft, said steering shaft being fixedly attached to said connecting member.

2. The tiltable hand truck of claim 1, further comprising a handle connected to said steering assembly.

3. The tiltable hand truck of claim 1, further comprising a handle connected to said substantially U-shaped frame.

4. The tiltable hand truck of claim 2, wherein said handle further comprises a multidirectional movable joint.

5. The tiltable hand truck of claim 1, wherein said at least one pair of wheels are each axially attached to each of said side members near said open front.

6. The tiltable hand truck of claim 1, wherein two wheels are axially attached to said steering shaft.

7. The tiltable hand truck of claim 1, wherein said two side members are substantially parallel.

8. The tiltable hand truck of claim 1, wherein said connecting member is fixedly attached to said right side member.

9. The tiltable hand truck of claim 1, wherein said connecting member is fixedly attached to said left side member.

10. The tiltable hand truck of claim 1, wherein said steering shaft is releasably and rotatably connected to said connecting member.

11. The tiltable hand truck of claim 1, wherein said connecting member is releasably and rotatably connected to said rear member.

12. The tiltable hand truck of claim 1, wherein said connecting member is releasably and rotatably connected to both said rear member and said steering assembly.

13. The tiltable band truck of claim 1, wherein said steering assembly and said shaft are connected by means of a pin and a socket.

14. The tiltable band truck of claim 1, wherein said connecting member and said rear member are connected by means of a pin and a socket.

15. The tiltable hand truck of claim 1, where in said connecting member is connected to both said rear member and said steering assembly by means of a pin and a socket.

16. The tiltable hand truck of claim 1, wherein said each wheel of said pair of wheels is axially attached outwardly to each of said two side members near said open front.

17. The tiltable hand truck of claim 1, further comprising a latch attached to said rear member, wherein said tiltable platform is releasably latched to said rear member.

18. The tiltable hand truck of claim 1, further comprising a latch attached to said connecting member, wherein said tiltable platform is releasably latched to said connecting member.

19. A transport device comprising:
    a means for carrying a load, tiltable attached to a means for support;
    a means for halting the tilt of said carrying means attached to said support means;
    a means for moving said support means attached to said support means;
    a means for latching said carrying means attached to said support means;
    whereby said transport device can be moved in close proximity to said load, said carrying means tilted to the base of said load, said load tilted such that the carrying means can access the bottom side of said load, said carrying means tilted back into position, whereby said halting means impedes further motion and stabilizes said carrying means, said means for latching applied to said carrying means to impede further tilting, said transport device with said load can be moved to a new location, said carrying means tilted to the ground and said load offloaded into a desired position.

* * * * *